A display device includes a display panel including a pixel and a drive circuit configured to drive the pixel, a light source device configured to emit emitted light toward the display panel, a color separation element placed between the display panel and the light source device, the color separation element being configured to disperse the emitted light and to emit, to the pixel, a plurality of rays of separated light with wavelengths different from each other, and a light-shielding member placed in the display panel, the light-shielding member being configured to block the emitted light heading toward the drive circuit.

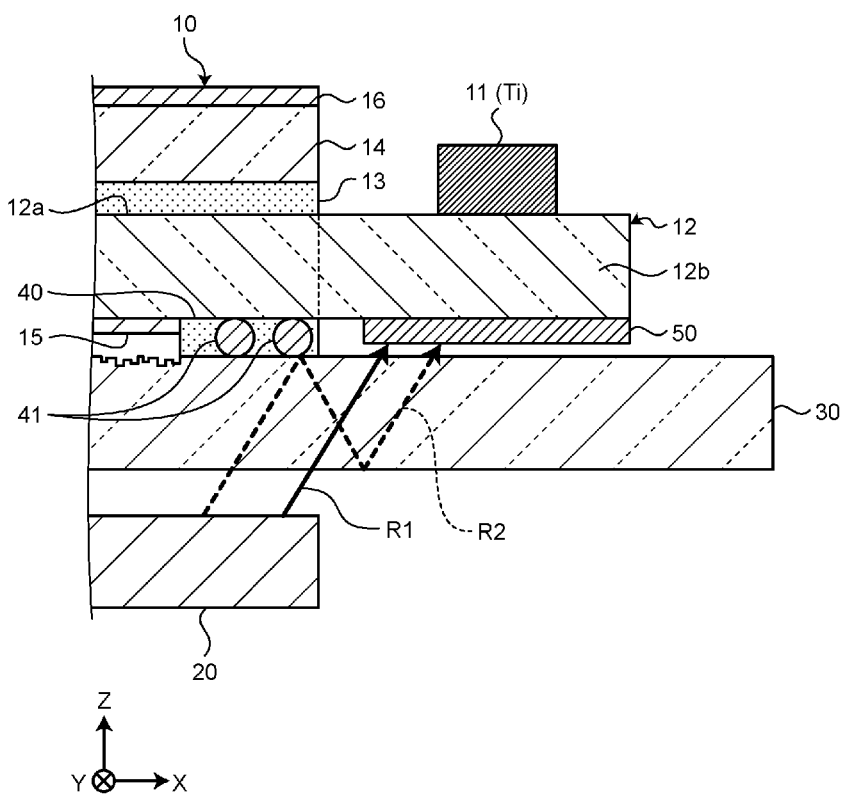

DISPLAY DEVICE

CROSS-REFERENCE TO RELATED APPLICATION

This application claims the benefit of priority from Japanese Patent Application No. 2022-160867 filed on Oct. 5, 2022, the entire contents of which are incorporated herein by reference.

BACKGROUND

1. Technical Field

The present disclosure relates to a display device.

2. Description of the Related Art

The display device in Japanese Patent Application Laid-open Publication No. 2022-121424 includes a display portion with a liquid crystal element, and an integrated circuit (IC) is placed on a substrate. Light from a backlight enters the display portion. The display portion displays images by modulating light. The IC includes a drive circuit that drives the display portion.

However, if relatively strong light hits the IC, the drive circuit may malfunction.

It is an object of the present disclosure to suppress malfunctions of a drive circuit in a display device.

SUMMARY

A display device of the present disclosure includes a display panel including a pixel and a drive circuit configured to drive the pixel, a light source device configured to emit emitted light toward the display panel, a color separation element placed between the display panel and the light source device, the color separation element being configured to disperse the emitted light and to emit, to the pixel, a plurality of rays of separated light with wavelengths different from each other, and a light-shielding member placed in the display panel, the light-shielding member being configured to block the emitted light heading toward the drive circuit.

DETAILED DESCRIPTION

Figure 1:
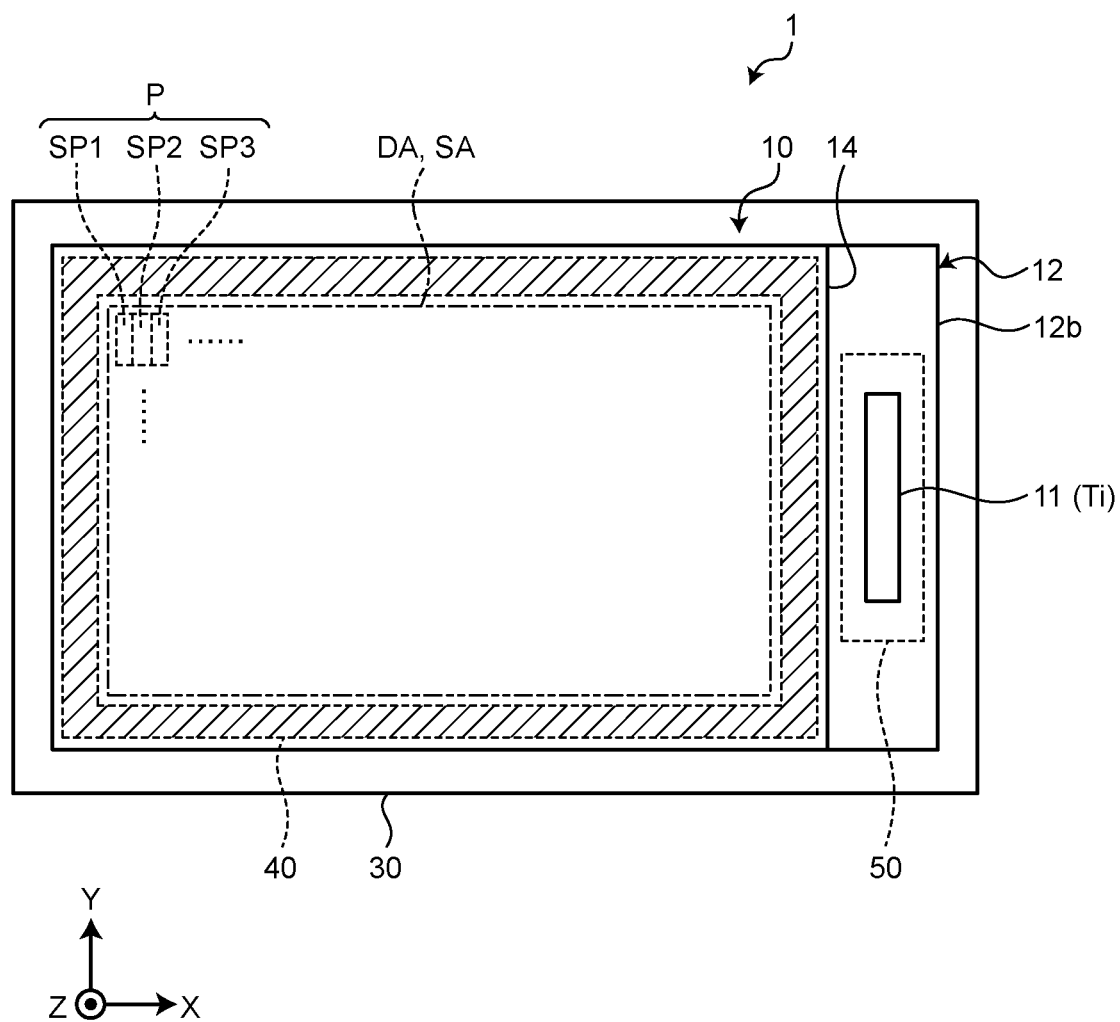
FIG. 1 is a plan view of a display device according to a first embodiment of the present disclosure.

Embodiments of the present disclosure will be described below with reference to the drawings. The present disclosure is not limited by what is described in the following embodiments. Components described below include those that can be easily assumed by a person skilled in the art and those that are substantially the same. Furthermore, the components described below can be combined as appropriate.

What is disclosed herein is merely an example, and any appropriate modification that would be easily conceived of by a person skilled in the art, while maintaining the purport of the present disclosure, is naturally included in the scope of the present disclosure. The drawings may schematically illustrate the width, thickness, shape, and the like of each part compared to the actual mode for the sake of clarity of explanation, but this is merely an example and does not limit the interpretation of the present disclosure. In the present specification and the drawings, elements similar to those described previously with respect to the drawings already mentioned are given the same reference signs and the detailed description thereof may be omitted as appropriate.

The X and Y directions illustrated in the drawings are orthogonal to each other and parallel to a main surface of a substrate included in a display device 1. The +X and −X sides in the X direction and the +Y and −Y sides in the Y direction correspond to the sides of the display device 1. The Z direction is orthogonal to the X and Y directions and corresponds to the thickness direction of the display device 1. The +Z side in the Z direction corresponds to the front surface side where an image is displayed in the display device 1, and the −Z side in the Z direction corresponds to the rear surface side of the display device 1. In the present specification, "plan view" refers to viewing the display device 1 from the +Z side to the −Z side along the Z direction. The X, Y, and Z directions are examples, and the present disclosure is not limited to these directions.

First Embodiment

Figure 2:
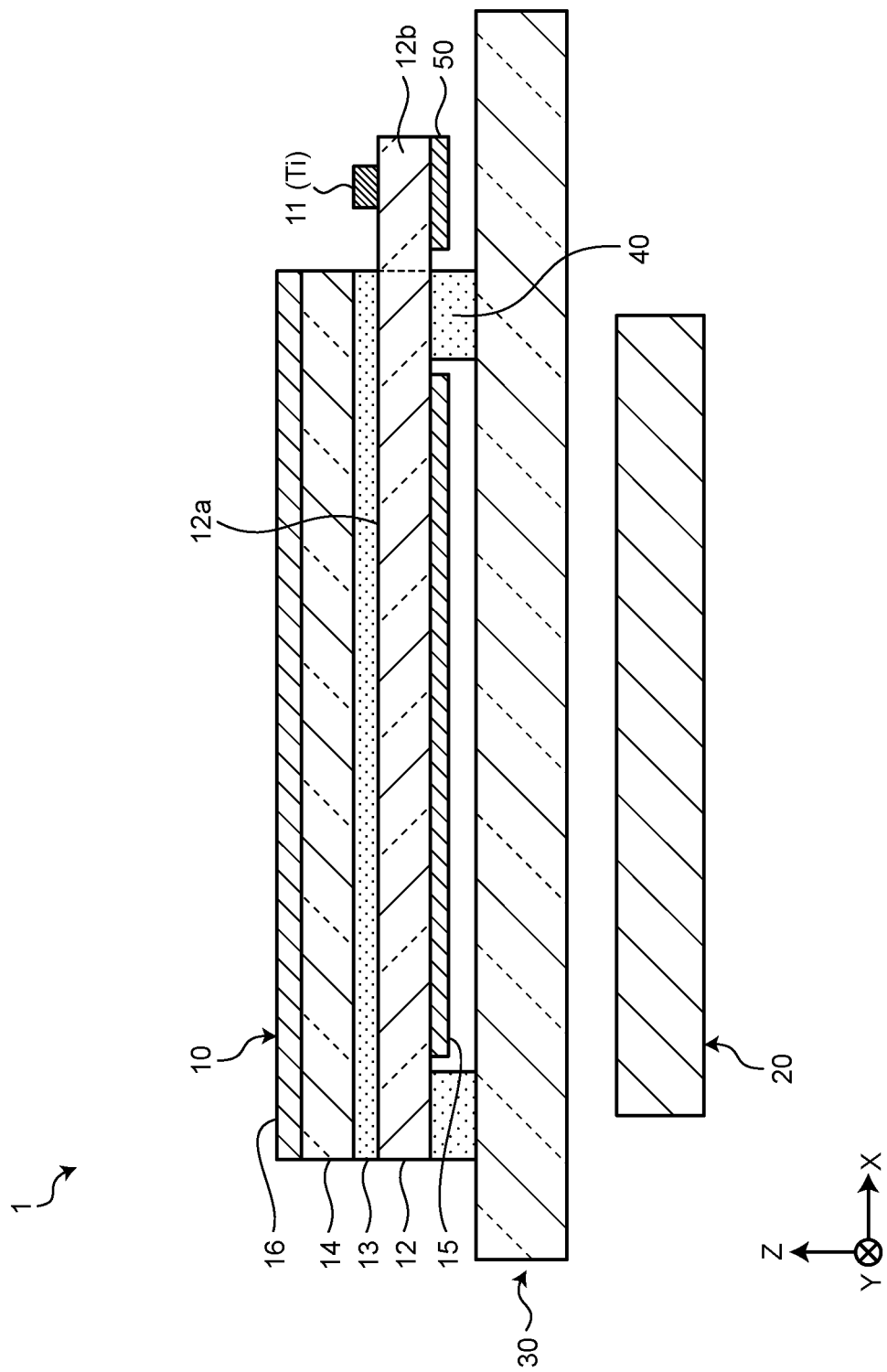
FIG. 2 is a sectional view of the display device.

FIG. 1 is a plan view of the display device 1 according to a first embodiment of the present disclosure. FIG. 2 is a sectional view of the display device 1. The display device 1 displays images on the basis of image signals output from an external device (not illustrated) that is electrically coupled through a flexible wiring board (not illustrated).

The display device 1 is applied, for example, to a head-up display. The head-up display projects an image onto a translucent object, such as a vehicle windshield, to allow a user to see a virtual image. The display device 1 includes a display panel 10, a light source device 20, a color separation element 30, and an adhesive portion 40. The light source device 20, the color separation element 30, and the display panel 10 are aligned in this order along the Z direction from the −Z side to the +Z side.

The display panel 10 is a transmissive liquid crystal display. The display panel 10 may be, for example, an organic electroluminescent (EL) display and an inorganic EL display. As illustrated in FIG. 1, the front surface of the display panel 10 has a display region DA where images are displayed. The display panel 10 includes a plurality of pixels P aligned in a matrix (row-column configuration) along the X and Y directions in the display region DA.

The pixels P each have a first sub-pixel SP1, a second sub-pixel SP2, and a third sub-pixel SP3. The first sub-pixel SP1 is a red sub-pixel. The second sub-pixel SP2 is a green sub-pixel. The third sub-pixel SP3 is a blue sub-pixel. The first sub-pixel SP1, the second sub-pixel SP2 and the third sub-pixel SP3 are aligned in this order along the X direction. The array of the first sub-pixel SP1, the second sub-pixel SP2 and the third sub-pixel SP3 is what is called a stripe array. Hereinafter, when the first sub-pixel SP1, the second sub-pixel SP2, and the third sub-pixel SP3 are described without distinction, they may simply be described as a "sub-pixel SP". Not to mention, the array of sub-pixels SP is not limited to a stripe array, and the colors of sub-pixels SP are not limited to the aforementioned colors.

Figure 3:
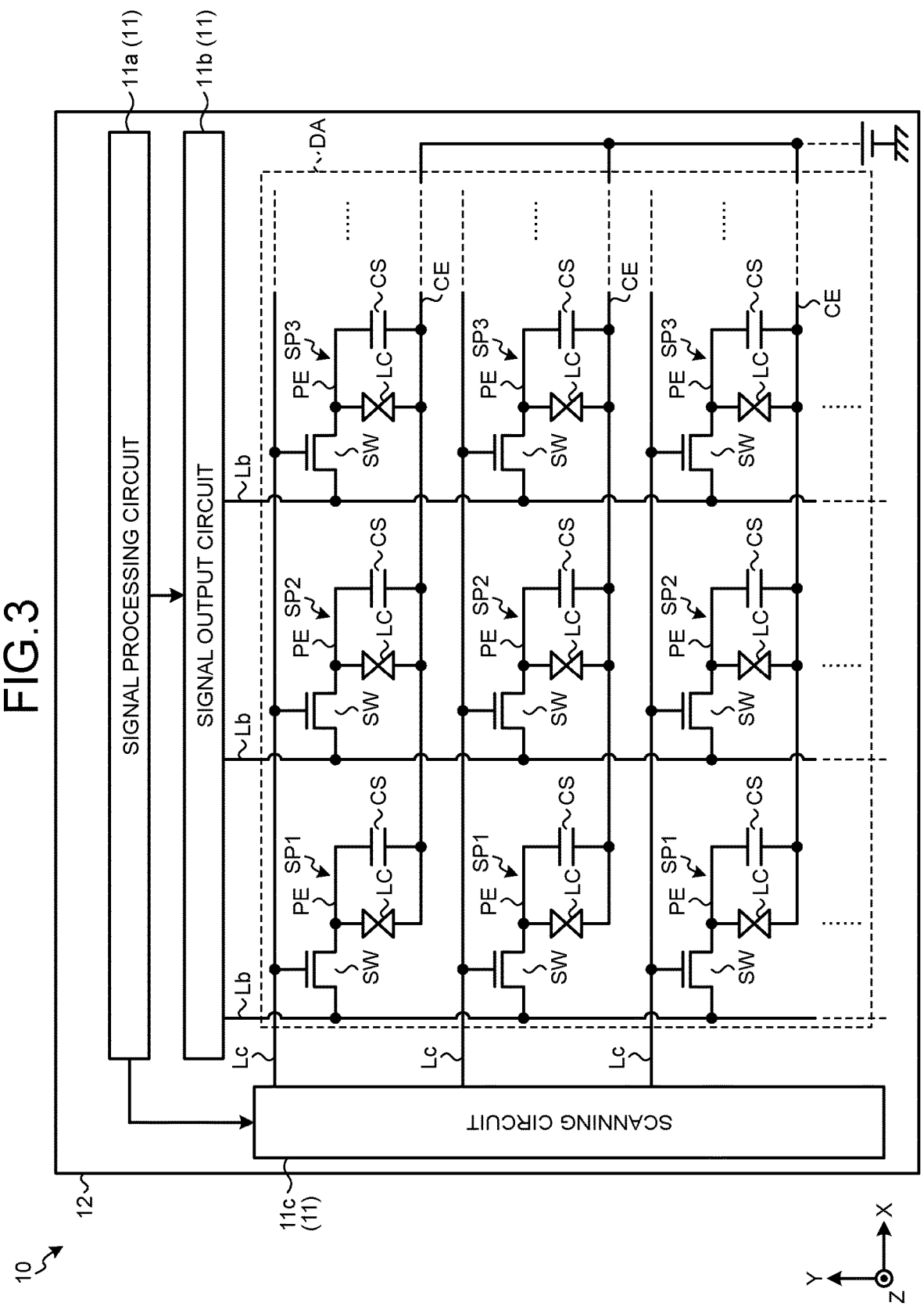
FIG. 3 is a view illustrating a circuit configuration of a display panel.

FIG. 3 is a view illustrating a circuit configuration of the display panel 10. The display panel 10 includes a drive circuit 11, as well as a switching element SW, a sub-pixel electrode PE, a common electrode CE, a liquid crystal capacitance LC, and a holding capacitance CS that are included in each of a plurality of the sub-pixels SP.

The drive circuit 11 drives the pixel P. The drive circuit 11 includes a signal processing circuit 11a, a signal output circuit 11b, and a scanning circuit 11c.

The signal processing circuit 11a outputs sub-pixel signals indicating gradations of the sub-pixels SP to the signal output circuit 11b on the basis of image signals transmitted from the external device. The signal processing circuit 11a outputs clock signals to the signal output circuit 11b and the scanning circuit 11c to synchronize the operation of the signal output circuit 11b with that of the scanning circuit 11c.

The signal output circuit 11b outputs the sub-pixel signals to the sub-pixels SP. The signal output circuit 11b and the sub-pixels SP are electrically coupled through a plurality of signal lines Lb extending along the Y direction.

The scanning circuit 11c scans the sub-pixels SP in synchronization with the output of the sub-pixel signals by the signal output circuit 11b. The scanning circuit 11c and the sub-pixels SP are electrically coupled through a plurality of scanning lines Lc extending along the X direction.

The switching element SW includes a thin-film transistor (TFT), for example. In the switching element SW, a source electrode is electrically coupled to the signal line Lb, and a gate electrode is electrically coupled to the scanning line Lc.

The sub-pixel electrode PE is coupled to a drain electrode of the switching element SW. A plurality of the common electrodes CE are arranged corresponding to the scanning lines Lc. The sub-pixel electrode PE and the common electrode CE are translucent.

The liquid crystal capacitance LC is a capacitive component of a liquid crystal material in a liquid crystal layer 13, which will be described below, between the sub-pixel electrode PE and the common electrode CE. The holding capacitance CS is placed between an electrode with the same potential as the common electrode CE and an electrode with the same potential as the sub-pixel electrode PE.

Figure 4:
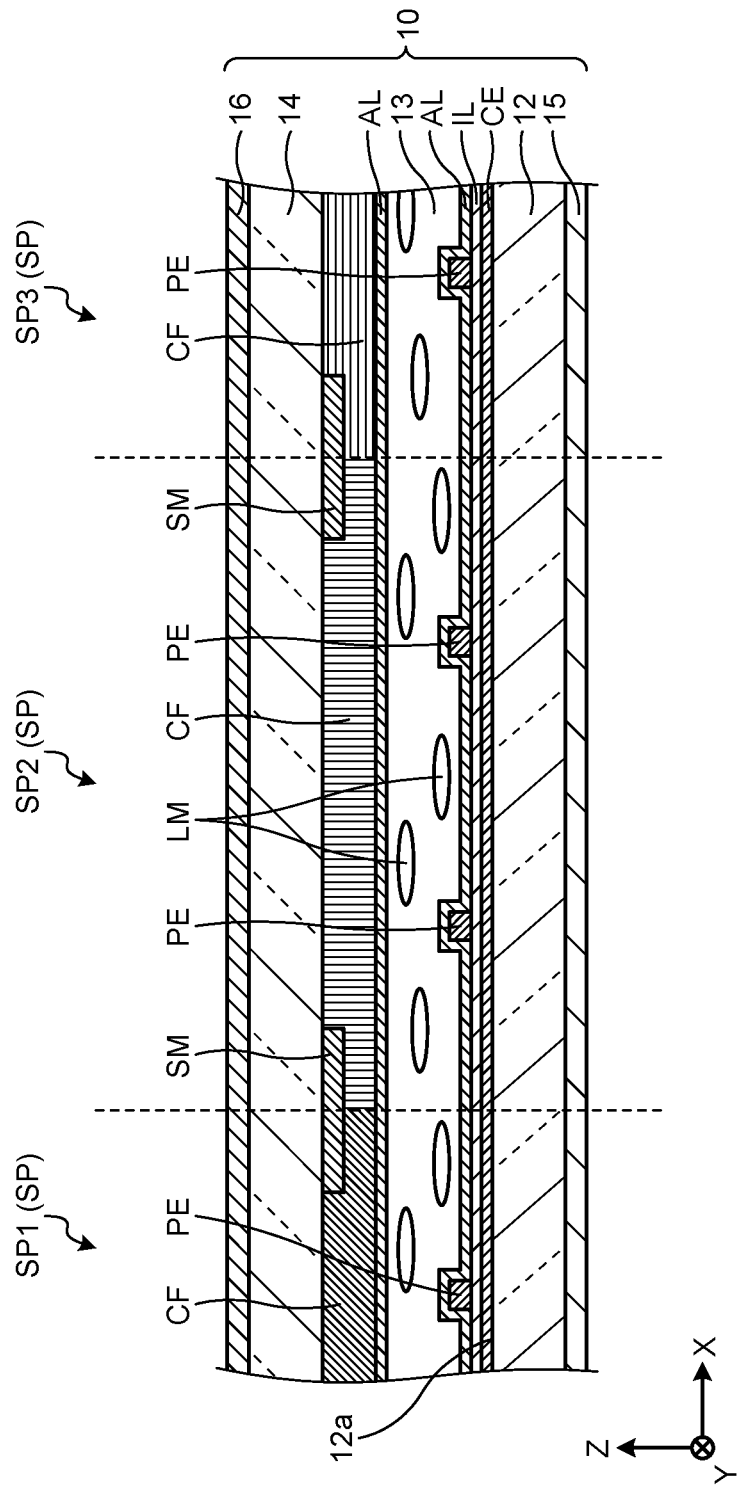
FIG. 4 is a sectional view of the display panel.

FIG. 4 is a sectional view of the display panel 10. The sub-pixel SP further includes a first substrate 12, the liquid crystal layer 13, and a second substrate 14. The first substrate 12, the liquid crystal layer 13, and the second substrate 14 are all translucent and are aligned in this order along the Z direction from the −Z side to the +Z side.

The first substrate 12 is rectangular in plan view and one first substrate 12 is provided for a plurality of the sub-pixels SP. The common electrode CE is placed on a main surface 12a on the +Z-side of the first substrate 12. An insulating layer IL is placed on the front surface of the common electrode CE, and the sub-pixel electrode PE and an orientation film AL are further placed.

The sub-pixel electrode PE is placed between the insulating layer IL and the orientation film AL. In this manner, the common electrode CE is placed on, and the sub-pixel electrode PE is placed above the first substrate 12. In other words, the display panel 10 is a horizontal electric field type liquid crystal display.

The second substrate 14 is located on the front surface side of the first substrate 12. In other words, the second substrate 14 is located on the opposite side of the color separation element 30 across the first substrate 12. The second substrate 14 is rectangular in plan view and one second substrate 14 is provided for a plurality of the sub-pixels SP. A color filter CF and a light-shielding film SM are placed on, and an orientation film AL is placed under the rear surface of the second substrate 14. The light-shielding film SM and the color filter CF are placed between the second substrate 14 and the orientation film AL.

The color filter CF is rectangular in plan view and one color filter CF is placed for one sub-pixel SP. The color filter CF is translucent, and the peak of the spectrum of light to be transmitted is predetermined. The peak of the spectrum corresponds to the color of the color filter CF. The color of the color filter CF is the same as that of the sub-pixel SP. In other words, the red first sub-pixel SP1 has a red color filter CF, the green second sub-pixel SP2 has a green color filter CF, and the blue third sub-pixel SP3 has a blue color filter CF.

The light-shielding film SM is lightproof and demarcates the sub-pixels SP. In other words, the light-shielding film SM overlaps in plan view the boundaries of the sub-pixels SP that are adjacent to each other in the X and Y directions. In FIG. 4, the signal line Lb and the scanning line Lc are omitted.

The liquid crystal layer 13 includes a plurality of liquid crystal molecules LM. The liquid crystal layer 13 is present between the first substrate 12 and the second substrate 14 and overlaps the display region DA in plan view. Specifically, the liquid crystal layer 13 is present between two orientation films AL facing each other. The orientation of the liquid crystal molecules LM is regulated by the two orientation films AL facing each other.

As illustrated in FIGS. 2 and 4, the display panel 10 further includes a first polarizing plate 15 placed on the rear surface of the first substrate 12 and a second polarizing plate 16 placed on the front surface of the second substrate 14.

The first polarizing plate 15 has a transmission axis orthogonal to the Z direction. The second polarizing plate 16 has a transmission axis orthogonal to the transmission axis of the first polarizing plate 15 and the Z direction.

As illustrated in FIGS. 1 and 2, the first substrate 12 has an exposed portion 12b that is exposed from the second substrate 14 in plan view. The exposed portion 12b is on the +X side of the second substrate 14 in plan view. An IC chip Ti including the drive circuit 11 is placed on the front surface of the exposed portion 12b. In other words, the drive circuit 11 is placed on the board surface of the first substrate 12 facing the second substrate 14. The front surface of the exposed portion 12b is part of the main surface 12a of the first substrate 12. The drive circuit 11 is located outside (specifically on the +X side) of the display region DA in plan view.

The drive circuit 11 outputs sub-pixel signals to the sub-pixels SP on the basis of image signals, thereby generating an electric field in the liquid crystal layer 13 and changing the orientation of the liquid crystal molecules LM. Thus, the light transmitted through the display panel 10 is modulated, to display an image.

As illustrated in FIG. 2, the light source device 20 is placed on the rear surface side of the display panel 10. The light source device 20 emits light (hereinafter described as emitted light) toward the display panel 10. The light source device 20 is, for example, a direct-lit backlight and has a plurality of light-emitting diodes (not illustrated). When the display device 1 is applied to a head-up display, the luminance and light quantity of the light source device 20 are substantially large compared to when the display device 1 is applied to a mobile terminal, and the emitted light from the light source device 20 hits the drive circuit 11 (IC chip Ti), which has a greater effect on the drive circuit 11.

As illustrated in FIGS. 1 and 2, the color separation element 30 is a rectangular plate in plan view. The color separation element 30 is larger than the display panel 10 in plan view. The periphery of the color separation element 30 is located outside the periphery of the display panel 10 in plan view. The color separation element 30 overlaps in plan view the IC chip Ti including the drive circuit 11. The color separation element 30 overlaps the exposed portion 12b in plan view. Part of the color separation element 30 may be located outside of the display panel 10 in plan view.

As illustrated in FIG. 2, the color separation element 30 is placed between the display panel 10 and the light source device 20. The color separation element 30 is translucent, and the emitted light from the light source device 20 enters the display panel 10 through the color separation element 30.

Figure 5:
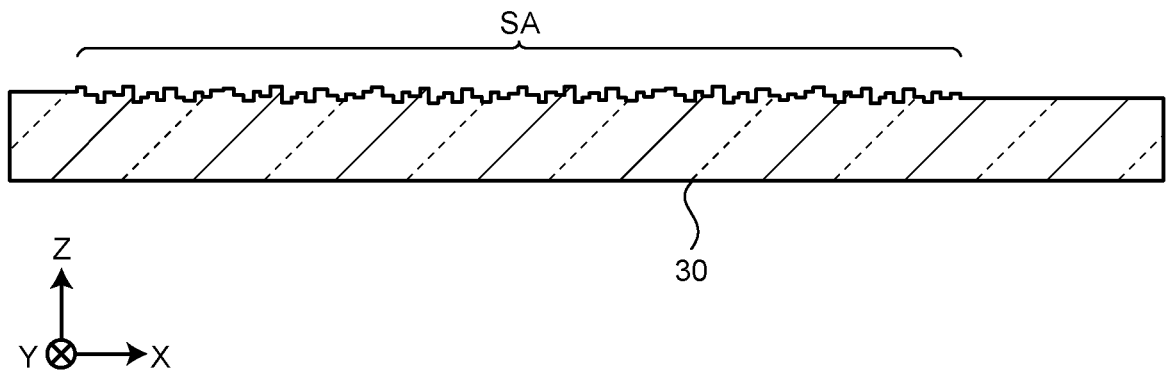
FIG. 5 is a sectional view of a color separation element.
Figure 6:
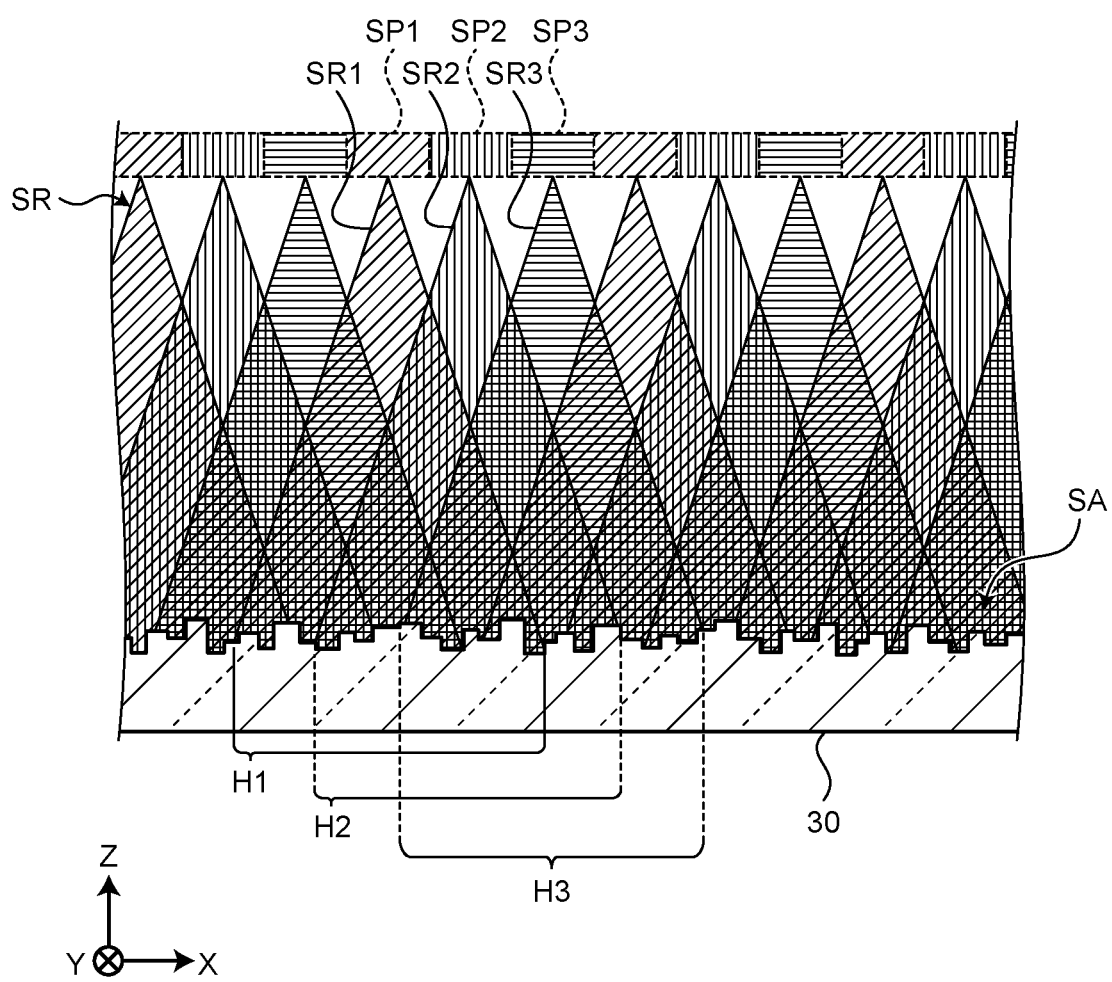
FIG. 6 is an enlarged sectional view of the color separation element.

FIG. 5 is a sectional view of the color separation element 30. FIG. 6 is an enlarged sectional view of the color separation element 30. The color separation element 30 disperses the emitted light from the light source device 20 and emits, to the pixel P, a plurality of rays of separated light SR with wavelengths different from each other. The color separation element 30 has a separation region SA that emits the separated light SR. The separation region SA is on the board surface of the color separation element 30 (front surface of the color separation element 30) facing the display panel 10 and overlaps the display region DA in plan view.

As illustrated in FIG. 6, the separated light SR emitted from the separation region SA includes first separated light SR1 in red, the same color as the color of the first sub-pixel SP1, second separated light SR2 in green, the same color as the second sub-pixel SP2, and third separated light SR3 in blue, the same color as the third sub-pixel SP3. In the separation region SA, the front surface of the color separation element 30 has a given uneven shape.

The given uneven shape is such that the first separated light SR1 gathers in the first sub-pixel SP1 from a first range H1, which is larger than the first sub-pixel SP1 in plan view and overlaps the first sub-pixel SP1 in plan view. The given uneven shape is such that the second separated light SR2 gathers in the second sub-pixel SP2 from a second range H2, which is larger than the second sub-pixel SP2 in plan view and overlaps the second sub-pixel SP2 in plan view. Furthermore, the given uneven shape is such that the third separated light SR3 gathers in the third sub-pixel SP3 from a third range H3, which is larger than the third sub-pixel SP3 in plan view and overlaps the third sub-pixel SP3 in plan view.

There are a plurality of the first ranges H1 corresponding to the first sub-pixels SP1. There are a plurality of the second ranges H2 corresponding to the second sub-pixels SP2. There are a plurality of the third ranges H3 corresponding to the third sub-pixels SP3. The first range H1, the second range H2, and the third range H3 have portions overlapping each other in plan view.

In this manner, the color separation element 30 separates the emitted light from the light source device 20 for each wavelength corresponding to the color of the individual color filter CF, and causes the light (separated light SR) with the wavelength corresponding to the color filter CF to enter and be transmitted through the color filter CF. Thus, the loss of the emitted light from the light source device 20 can be suppressed and the utilization efficiency can be increased compared to a case in which the display device 1 does not include the color separation element 30 and the emitted light from the light source device 20 directly enters the display panel 10.

As illustrated in FIG. 2, the adhesive portion 40 is present between the display panel 10 and the color separation element 30. The adhesive portion 40 bonds the display panel 10 to the color separation element 30. As illustrated in FIG. 1, the adhesive portion 40 is present between the periphery of the display region DA and the periphery of the second substrate 14 in plan view. That is, the adhesive portion 40 is present between the periphery of the separation region SA and the periphery of the second substrate 14 in plan view. The adhesive portion 40 is formed by an adhesive. The adhesive is, for example, an ultraviolet (UV) curable adhesive. The first polarizing plate 15 is inside the adhesive portion 40 in plan view.

Figure 7:
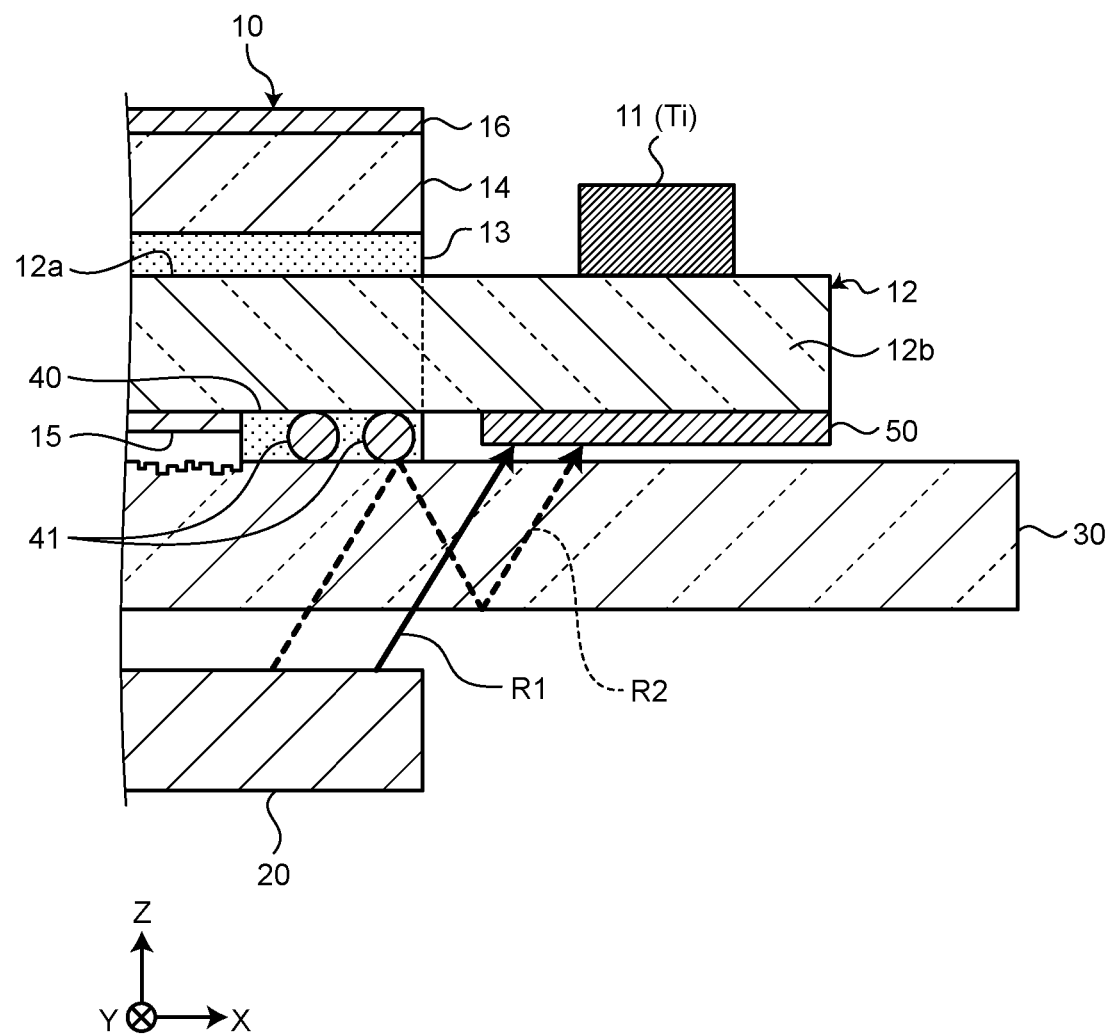
FIG. 7 is a partially enlarged sectional view of an area around a drive circuit in the display device.

FIG. 7 is a partially enlarged sectional view of an area around the drive circuit 11 in the display device 1. The adhesive portion 40 contains a plurality of gap members 41 of a given size. The gap members 41 are contained in the adhesive. The gap member 41 is spherical, for example, and has a given diameter corresponding to the given size.

The gap member 41 is sandwiched by the display panel 10 and the color separation element 30. Thus, the distance in the Z direction between the display panel 10 and the color separation element 30 is substantially constant at the given diameter. The given diameter is defined as the size at which the separated light SR gathers in the sub-pixel SP.

The display device 1 further includes a light-shielding member 50. The light-shielding member 50 is placed in the display panel 10. Specifically, the light-shielding member 50 is placed on the rear surface of the exposed portion 12b of the first substrate 12. In other words, the light-shielding member 50 is placed on the board surface of the first substrate 12 facing the color separation element 30. The light-shielding member 50 is outside (specifically on the +X side) of the adhesive portion 40 in plan view. As illustrated in FIGS. 1 and 7, the light-shielding member 50 is at a position overlapping the IC chip Ti, that is, the drive circuit 11, in plan view.

The light-shielding member 50 is affixed to the rear surface of the exposed portion 12b. The light-shielding member 50 is specifically a lightproof black adhesive tape. That is, the light-shielding member 50 is a light-shielding tape.

The light-shielding member 50 blocks the emitted light heading toward the drive circuit 11. Specifically, as illustrated by the solid arrow, the light-shielding member 50 blocks first emitted light R1 heading from the light source device 20 directly to the drive circuit 11 (IC chip Ti). As illustrated by the dashed arrow, the light-shielding member 50 blocks second emitted light R2 that is reflected by the board surface of the color separation element 30 and the adhesive portion 40 and is directed to the drive circuit 11. In other words, the light-shielding member 50 is at a position to block the first emitted light R1 and the second emitted light R2.

In this manner, the light-shielding member 50 blocks the emitted light heading toward the drive circuit 11, thereby preventing the emitted light from hitting the drive circuit 11. Therefore, even when the emitted light is relatively strong, malfunctions of the drive circuit 11 can be prevented.

The light-shielding member 50 may be a light-shielding tape in a lightproof color other than black. In this case, the intensity of the emitted light hitting the drive circuit 11 can be suppressed.

Second Embodiment

The display device 1 according to a second embodiment of the present disclosure will be described next mainly with respect to parts that differ from those of the first embodiment described above.

Figure 8:
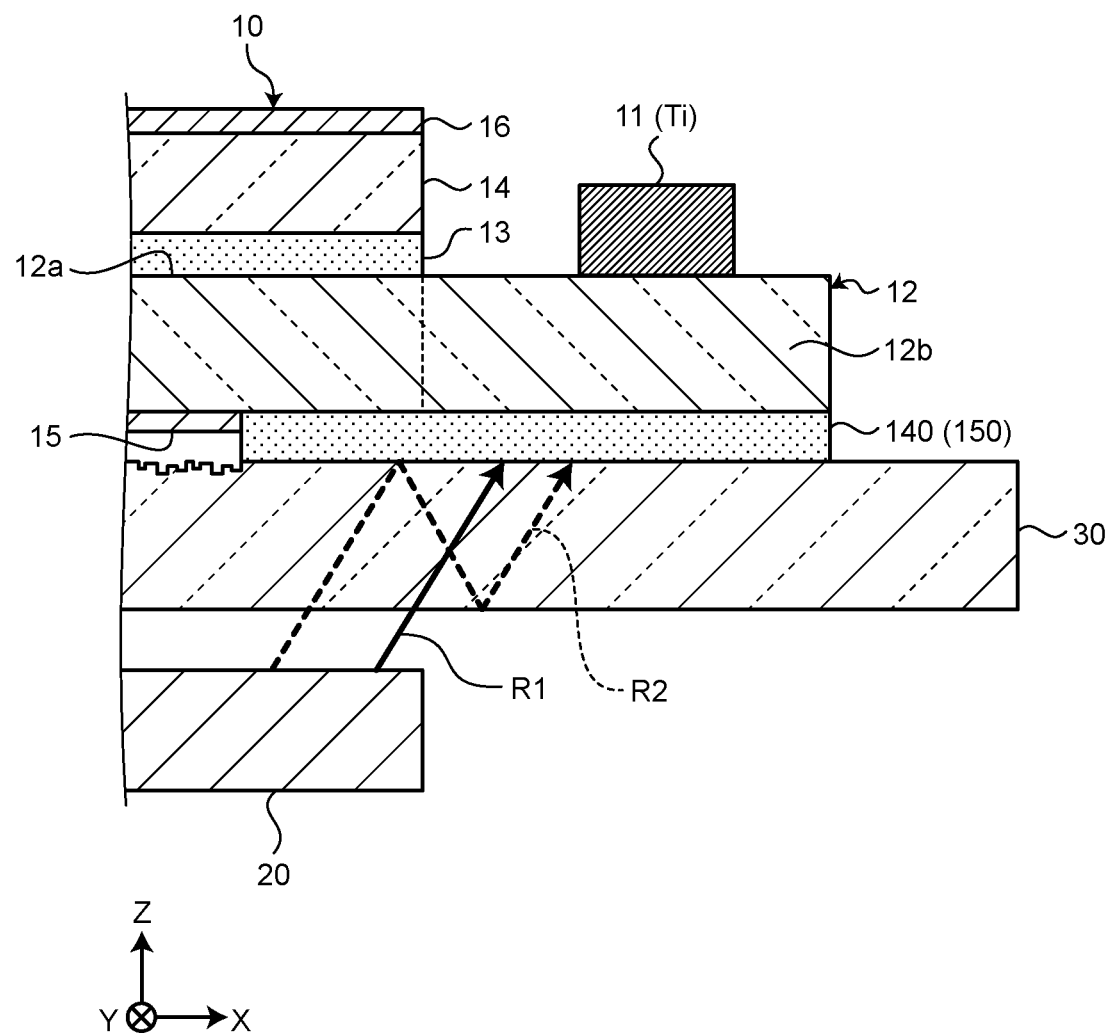
FIG. 8 is a partially enlarged sectional view of an area around a drive circuit in a display device according to a second embodiment of the present disclosure.

FIG. 8 is a partially enlarged sectional view of an area around the drive circuit 11 in the display device 1 according to the second embodiment of the present disclosure. A light-shielding member 150 of this second embodiment is an adhesive portion 140.

The adhesive portion 140 of this second embodiment is at a position overlapping the drive circuit 11 in plan view. The adhesive portion 140 is present between the exposed portion 12b and the color separation element 30. Specifically, the adhesive portion 140 is present between the separation region SA and the periphery on the +X-side of the exposed portion 12b in plan view.

The adhesive portion 140 is lightproof. Specifically, the adhesive portion 140 is formed by a lightproof adhesive. The lightproof adhesive is a black adhesive.

The adhesive portion 140 blocks the first emitted light R1 and the second emitted light R2, thereby preventing the emitted light from hitting the drive circuit 11. Thus, malfunctions of the drive circuit 11 can be prevented.

The adhesive portion 140 may be formed by a milky white adhesive, for example. In this case, the intensity of the emitted light hitting the drive circuit 11 can be suppressed.

Third Embodiment

The display device 1 according to a third embodiment of the present disclosure will be described next mainly with respect to parts that differ from those of the first embodiment described above.

Figure 9:
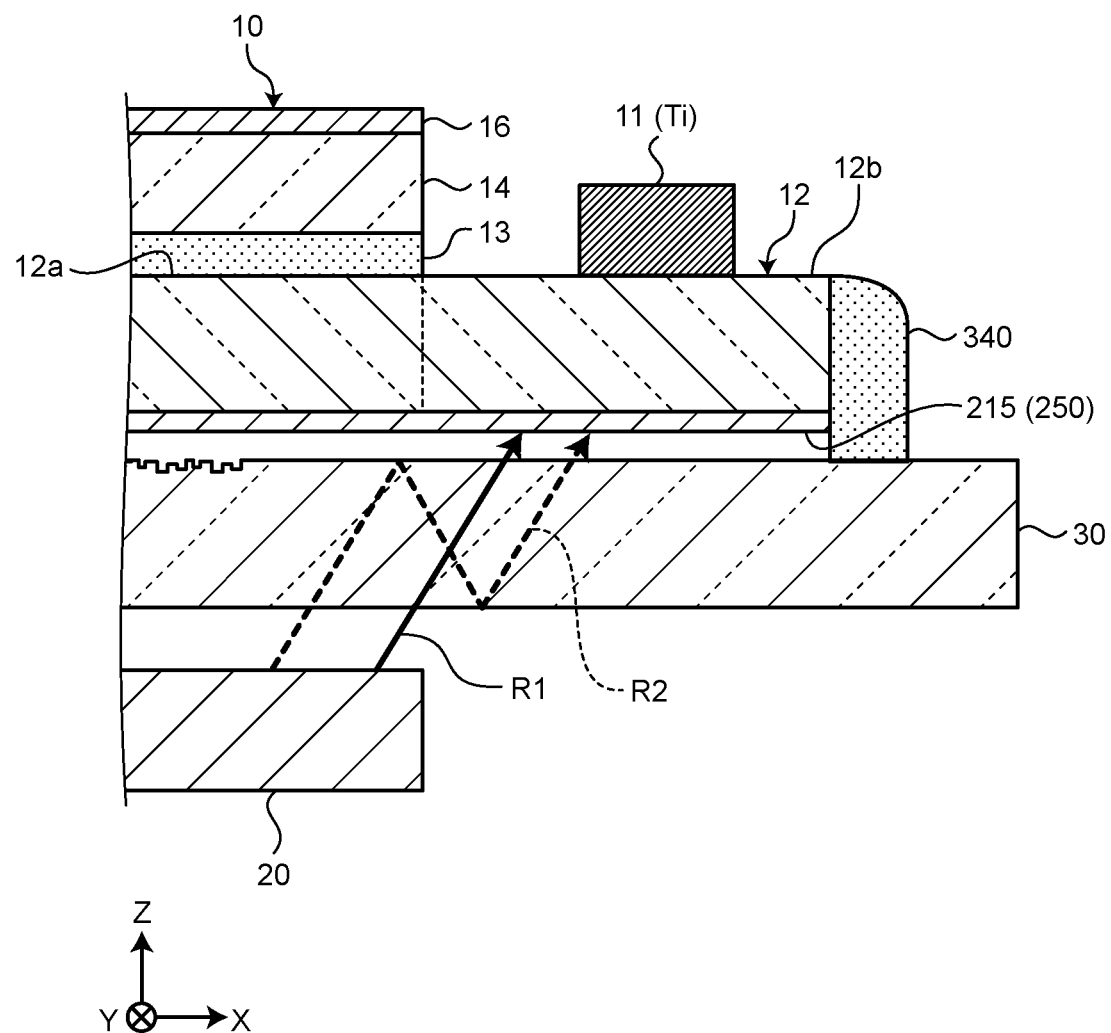
FIG. 9 is a partially enlarged sectional view of an area around a drive circuit in a display device according to a third embodiment of the present disclosure.

FIG. 9 is a partially enlarged sectional view of an area around the drive circuit 11 in the display device 1 according to the third embodiment of the present disclosure. A light-shielding member 250 of this third embodiment is a first polarizing plate 215.

The first polarizing plate 215 of this third embodiment is at a position overlapping the drive circuit 11 in plan view. In this case, the first polarizing plate 215 has a size that can be placed also on the rear surface of the exposed portion 12b. In this case, an adhesive portion 240 bonds the side surface of the exposed portion 12b to the color separation element 30.

The first polarizing plate 215 absorbs a component in the first emitted light R1 and the second emitted light R2 that intersects the transmission axis of the first polarizing plate 215, thereby suppressing the intensity of the emitted light hitting the drive circuit 11. Thus, malfunctions of the drive circuit 11 can be suppressed.

Although preferred embodiments of the present disclosure have been described above, the present disclosure is not limited to such embodiments. What is disclosed in the embodiments is merely an example, and various modifications can be made without departing from the intent of the present disclosure. Any appropriate modification made to the extent not departing from the intent of the present disclosure naturally belongs to the technical scope of the present disclosure.

For example, the aforementioned display panel 10 may be a vertical electric field type liquid crystal display in which the common electrode CE is placed on the second substrate 14 in a state of facing the sub-pixel electrodes PE.

The exposed portion 12b may be exposed from a side other than the +X side from the second substrate 14 in plan view.

The color separation element 30 may be shaped so as not to overlap the drive circuit 11 (IC chip Ti) in plan view.

The light-shielding member 50 may be a lightproof printed body. The printed body is formed by printing (e.g., screen printing) a lightproof paint. The paint is, for example, black paint.

It is understood that any other effects brought about by the modes described in the embodiments that are obvious from the description of the present specification or that would be conceived of by a person skilled in the art are naturally brought about by the present disclosure.

What is claimed is:

1. A display device comprising:
    a display panel including a pixel and a drive circuit configured to drive the pixel;
    a light source device configured to emit emitted light toward the display panel;
    a color separation element placed between the display panel and the light source device, the color separation element being configured to disperse the emitted light and to emit, to the pixel, a plurality of rays of separated light with wavelengths different from each other; and
    a light-shielding member placed in the display panel, the light-shielding member being configured to block the emitted light heading toward the drive circuit, wherein
    the display panel comprises a first substrate, a second substrate, and a liquid crystal layer, the second substrate being located on an opposite side of the color separation element across the first substrate, the liquid crystal layer being present between the first substrate and the second substrate,
    the drive circuit is placed on a board surface of the first substrate facing the second substrate, and
    the light-shielding member is at a position overlapping the drive circuit in plan view on the board surface of the first substrate facing the color separation element.

2. The display device according to claim 1, wherein the light-shielding member is a light-shielding tape.

3. The display device according to claim 1, further comprising an adhesive portion bonding the display panel to the color separation element, the adhesive portion being formed by a lightproof adhesive, wherein
    the light-shielding member is the adhesive portion.

4. The display device according to claim 1, wherein
    the display panel further comprises a polarizing plate, and
    the light-shielding member is the polarizing plate.

5. The display device according to claim 1, wherein the color separation element overlaps the drive circuit in plan view.

* * * * *